INVENTORS K. H. POHL
A. T. SPENCER
BY
ATTORNEY

United States Patent Office 3,340,714
Patented Sept. 12, 1967

3,340,714
METHOD FOR DEFORMING METAL-PLASTIC LAMINATES
Karl-Heinz Pohl, Matawan, and Arthur T. Spencer, New Providence, N.J., assignors to Bell Telephone Laboratories, Incorporated, Murray Hill, Berkeley Heights, N.J., a corporation of New York
Original application Nov. 19, 1963, Ser. No. 324,700. Divided and this application May 26, 1966, Ser. No. 553,127
3 Claims. (Cl. 72—342)

ABSTRACT OF THE DISCLOSURE

A method for deforming a laminate including a pair of metal body members having a thin sheet of a thermoplastic material therebetween involves the localized heating and cooling of specific areas of the laminate so that it may be subjected to deep drawing steps without the destruction or the introduction of residual stress patterns.

---

This application is a divisional application of our copending application, Ser. No. 324,700, filed Nov. 19, 1963, now abandoned.

The present invention relates to a method for deforming laminates under the application of localized heating. More particularly, the present invention relates to a method for deforming laminates having a pair of metal body members spaced from one another by a thin sheet of a thermoplastic material wherein localized heating and cooling of the laminate permit deep drawing without destroying the laminate or introducing deleterious residual stress patterns.

The invention will be more readily understood by reference to the accompanying specification and drawing wherein.

Laminates of the type described in our copending application, Ser. No. 553,126, filed May 26, 1966, which employ core materials evidencing excellent strength properties may be deformed in accordance with the present invention by a procedure wherein residual stresses in the deformed laminate are held to a minimum. The inventive method involves the application of localized heating to the laminate in a forming tool whereby flow in the soft thermoplastic core is permitted between the metal skins, thereby permitting relief of strain introduced in the deforming process.

Figure 1:
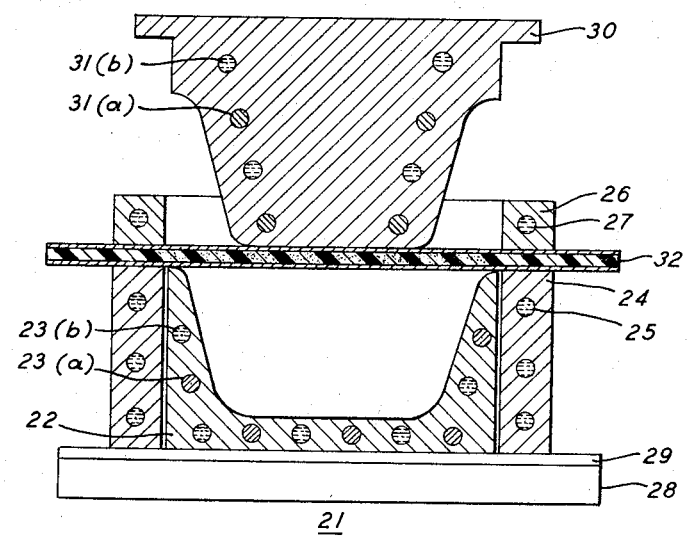
FIG. 1 is a cross-sectional view of a forming die suitable for the practice of the inventive forming technique.

With further reference now to FIG. 1, there is shown in cross-sectional view a forming tool suitable for the practice of the present invention. Shown in the figure is forming tool 21 including a female member 22, having means 23(a) and 23(b) for alternately heating and cooling member 22, surrounded by a concentric cooling ring 24, having cooling means 25, and blankholder 26, having cooling means 27, member 22 being supported by base plate 28. Shown intermediate of base plate 28 and female member 22 is heat insulation pad 29. Male member 30, having means 31(a) and 31(b) for alternately heating and cooling completes the device. The cavity of the drawing tool is equipped with air vents (not shown) for the purpose of venting the air being compressed by the downward motion of the laminate.

In the operation of the deforming process, the apparatus is opened and laminate 32, prepared as described in our copending application alluded to hereinabove is positioned atop female member 22 and cooling ring 24 which are intermediate blankholder 26 and male member 30. The laminate utilized includes a pair of metal body members spaced from one another by a thin sheet of a thermoplastic material. Next, the various members of the device are regulated to the temperatures set forth in the following exemplary schedule.

| Member: | Temperature, ° F., Approx. |
|---|---|
| 22 | 350 |
| 24 | 60 |
| 26 | 60 |
| 30 | 350 |

Following, blankholder 26 moves downward and clamps laminate 32 against cooling ring 24 under the influence of moderate pressure and male member 30 begins its vertical descent under a pressure of the order of 350 pounds per square inch, such descent being continued until it is in contact with laminate 32. Contact is permitted for a time period of the order of 15 seconds during which the core of the laminate is rapidly softened and transformed into a viscous mass. During this period, the edges of laminate 32 which are rigidly clamped between the cooled blankholder 26 and cooling ring 24 are maintained in the solid state and are capable of withstanding the pressure of the molten core.

Figure 3:
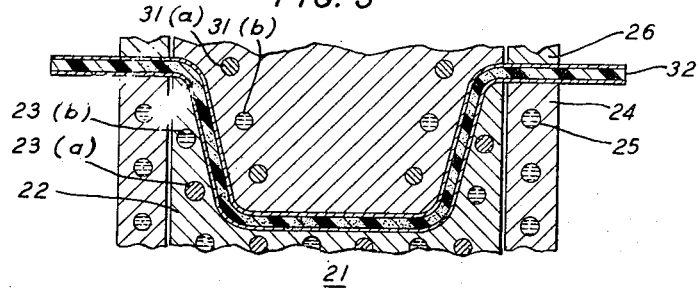
FIG. 3 is a cross-sectional view of the die of FIG. 2 at the conclusion of the forming process.

Immediately thereafter, further pressure is applied to laminate 32, so causing a deformation therein and such applied pressure is transmitted uniformly to the outer skin thereof so resulting in a similar deformation, as shown in FIG. 3. This procedure is continued with a uniform drawing of the metal over its entire surface area until the mold is completely closed, as shown in FIG. 4.

Next, with the forming tool in the closed position, male member 30 and female member 22 are cooled to approximately 200° F. thereby assuring solidification of the laminate core. After cooling, member 30 is slowly retracted together with blankholder 26, thereby freeing the formed laminate which is dislodged from the device by ejector pins (not shown).

An example of the present invention is described in detail below. The example is included merely to aid in the understanding of the invention, and variations may be made by one skilled in the art without departing from the spirit and scope of the invention.

Six 5 x 6 inch plates of aluminum having a thickness of 0.025 inch (2024–T3 Alclad sheet), obtained from commercial sources, were wiped with acetone and inserted in a beaker containing the vapors of trichloroethylene. The aluminum plates were permitted to so remain until no further condensation of trichloroethylene occurred, as noted visually.

Next, the cleansed skins were roughened to a depth of approximately one mil by alumina grit blasting. Following, the plates were vapor degreased.

Figure 2:
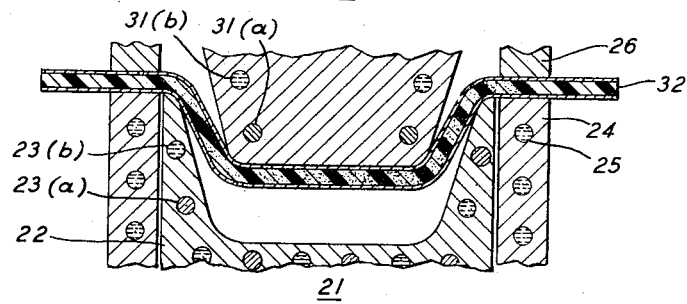
FIG. 2 is a cross-sectional view of the die of FIG. 2 shown midway through the forming of a laminate.

Each of the laminates so obtained was then inserted in a forming tool of the type shown in FIG. 2, the male and female members of the device having been preheated to a temperature of 350° F. and the cooling ring and blankholder having been precooled to 60° F. Next, the male member of the device was permitted to contact the laminate for 15 seconds after which a pressure of approximately 2000 p.s.i. was applied thereto until the device was in the closed position.

Finally, both the male and female members of the device were cooled to 200° F. and the resultant formed laminates removed therefrom.

While the invention has been described in detail in the foregoing specification, and the drawing similarly illustrates the same, the aforesaid is by way of illustration only and is not restrictive in character. It will be appreciated by those skilled in the art that the described method may be employed in deforming any laminate structure including a pair of metal body members spaced from each other by a thin sheet of a thermoplastic material.

What is claimed is:

1. The method of forming a laminate which comprises the steps of inserting the edges of a laminate, having a pair of metal body members spaced from one another by a thin sheet of a thermoplastic material, between a holder and a holder seat, maintaining said holder and said holder seat at a temperature below the softening point of said thermoplastic material, applying a male die to one of said metal layers, said die being heated to a temperature above the softening point of said thermoplastic material, thereby plasticizing said thermoplastic material in all areas but those between said holder and said holder seat, forming said laminate by deforming it between said male die and a female die heated to a temperature above the softening point of said thermoplastic material, cooling said dies to a temperature below the softening point of said material, and removing the resultant formed laminate from between said dies by retracting said male die from said female die and said holder from said holder seat.

2. The method in accordance with the procedure of claim 1 wherein said holder and said holder seat are maintained at a temperature less than 60° F. and said male and female dies are maintained at a temperature of approximately 350° F.

3. The method in accordance with the procedure of claim 2 wherein said laminate comprises a pair of aluminum body members spaced from one another by a heat softenable thermoplastic material.

References Cited

UNITED STATES PATENTS

| | | | |
|---|---|---|---|
| 2,433,643 | 12/1947 | Beach | 264—322 |
| 2,697,057 | 12/1954 | Senger | 264—292 |
| 2,742,387 | 4/1956 | Giuliani | 156—224 |
| 3,039,911 | 6/1962 | Fox | 264—321 |
| 3,140,325 | 7/1964 | Graff | 156—224 |
| 3,192,092 | 6/1965 | Schonhorn | 161—216 |
| 3,234,310 | 2/1966 | Edwards | 264—327 |
| 3,244,779 | 4/1966 | Levey | 264—291 |

ROBERT F. WHITE, *Primary Examiner.*

R. R. KUCIA, *Assistant Examiner.*